United States Patent
Hamilton

(10) Patent No.: US 10,326,962 B2
(45) Date of Patent: Jun. 18, 2019

(54) VEHICLE-MOUNTABLE DATA DISPLAY DEVICE

(71) Applicant: Carl Heath Hamilton, Millersport, OH (US)

(72) Inventor: Carl Heath Hamilton, Millersport, OH (US)

( * ) Notice: Subject to any disclaimer, the term of this patent is extended or adjusted under 35 U.S.C. 154(b) by 433 days.

(21) Appl. No.: 14/750,486

(22) Filed: Jun. 25, 2015

(65) Prior Publication Data

US 2015/0381922 A1   Dec. 31, 2015

Related U.S. Application Data

(60) Provisional application No. 62/017,300, filed on Jun. 26, 2014.

(51) Int. Cl.

| | |
|---|---|
| *H04N 5/655* | (2006.01) |
| *H04N 5/63* | (2006.01) |
| *H04N 5/645* | (2006.01) |
| *H04N 5/57* | (2006.01) |
| *H04N 5/38* | (2006.01) |
| *G09F 21/04* | (2006.01) |
| *G09F 27/00* | (2006.01) |

(52) U.S. Cl.
CPC .............. *H04N 5/655* (2013.01); *G09F 21/04* (2013.01); *G09F 21/043* (2013.01); *G09F 27/00* (2013.01); *G09F 27/007* (2013.01); *H04N 5/645* (2013.01); *H04N 5/63* (2013.01)

(58) Field of Classification Search
CPC .................... H04N 5/655; G09F 21/04
See application file for complete search history.

(56) References Cited

U.S. PATENT DOCUMENTS

| | | | |
|---|---|---|---|
| 3,318,031 A | 5/1967 | Whaley et al. | |
| 5,132,666 A | 7/1992 | Fahs | |
| 5,918,924 A | 7/1999 | Cowan | |
| 6,812,851 B1 * | 11/2004 | Dukach | G06Q 30/02 340/425.5 |

(Continued)

FOREIGN PATENT DOCUMENTS

| | | |
|---|---|---|
| CN | 2703677 Y | 6/2005 |
| CN | 101286286 A | 10/2008 |

(Continued)

OTHER PUBLICATIONS

WeatherEvents; "Demonstration of the roof mounted, LED matrix weather data display"; YouTube; Mar. 20, 2012; located at https://www.youtube.com/watch?v=DMv3L39-Z2Q.

(Continued)

*Primary Examiner* — Zaihan Jiang
(74) *Attorney, Agent, or Firm* — Thomas E. Lees, LLC

(57) ABSTRACT

A device for displaying data is disclosed. The device includes a mount, and enclosure with two outward-sloped walls, and two video displays within the enclosure each facing outward through windows in the outward-sloped walls of the enclosure. A shield optionally couples to the enclosure via a post. Also, optionally, a solar battery couples to the solar cell to store energy from the solar cell. Further, a panel optionally couples to the enclosure, e.g., via a hinge, track system, etc. so the panel may selectively cover and not cover at least one of the video displays in the windows of the enclosure.

19 Claims, 8 Drawing Sheets

(56) References Cited

U.S. PATENT DOCUMENTS

| | | | | |
|---|---|---|---|---|
| 6,901,987 | B1* | 6/2005 | Graham | G09F 11/29 |
| | | | | 160/121.1 |
| D650,321 | S | 12/2011 | Hamilton | |
| 8,122,628 | B2 | 2/2012 | Johnson, Jr. | |
| 9,343,002 | B2* | 5/2016 | Hagemann | G09F 13/005 |
| 2003/0159322 | A1* | 8/2003 | Mead | G09F 7/18 |
| | | | | 40/617 |
| 2008/0236007 | A1* | 10/2008 | Au | B60Q 1/2611 |
| | | | | 40/592 |
| 2009/0019748 | A1* | 1/2009 | Rosarius | G09F 21/048 |
| | | | | 40/591 |
| 2012/0102796 | A1* | 5/2012 | Kara | G09F 11/29 |
| | | | | 40/515 |
| 2012/0235889 | A1* | 9/2012 | Rappaport | G08B 27/00 |
| | | | | 345/87 |
| 2013/0099698 | A1* | 4/2013 | Podd | H05B 37/029 |
| | | | | 315/297 |
| 2013/0207473 | A1* | 8/2013 | Jain | H02J 7/35 |
| | | | | 307/65 |
| 2013/0335670 | A1* | 12/2013 | Huang | H05K 5/03 |
| | | | | 349/58 |
| 2014/0070963 | A1* | 3/2014 | DeLorean | G06Q 30/0241 |
| | | | | 340/917 |
| 2014/0266001 | A1* | 9/2014 | Wilde | H02J 7/355 |
| | | | | 320/101 |
| 2014/0338237 | A1* | 11/2014 | Chu | G09F 9/30 |
| | | | | 40/452 |

FOREIGN PATENT DOCUMENTS

| | | |
|---|---|---|
| CN | 203034390 U | 7/2013 |
| CN | 203063838 U | 7/2013 |
| EP | 1408477 A2 | 4/2004 |
| WO | 2012/064681 A2 | 5/2012 |

OTHER PUBLICATIONS

TaxiPanel; "Taxi Panels in Dublin", YouTube; May 26, 2008; located at https://www.youtube.com/watch?v=sl1GUHwGms0.

Michaelsignage; "Taxi Advertisement goes digital!", YouTube; Mar. 4, 2009; located at https://www.youtube.com/watch?v=2T76DH3URus.

Larry Hall; "Showrnedia's LED Taxi Tops"; YouTube; Aug. 15, 2011; located at https://www.youtube.com/watch?v=mHB4FMvrlol.

Pantallas Gigantes Led; "Pantalla Publicidad Taxi Led"; YouTube; Mar. 21, 2014; located at https://www.youtube.com/watch?v=pHVc-i6zdGc.

Eyetease Limited; "Digital Taxi Top Advertising", YouTube; Nov. 28, 2012; located at https://www.youtube.com/watch?v=qL_XRi8jHPQ.

TAXi-AD International; "TAXi-AD Portugal: Standvirtual promotion Lisbon"; YouTube; Sep. 12, 2011; located at https://www.youtube.com/watch?v=KtrjdDWpKTk.

Big Star Promotions; Franchise for Sale; downloaded on Feb. 24, 2014 from downloaded from http://www.funusajob.com/franchise-for-sale.html.

* cited by examiner

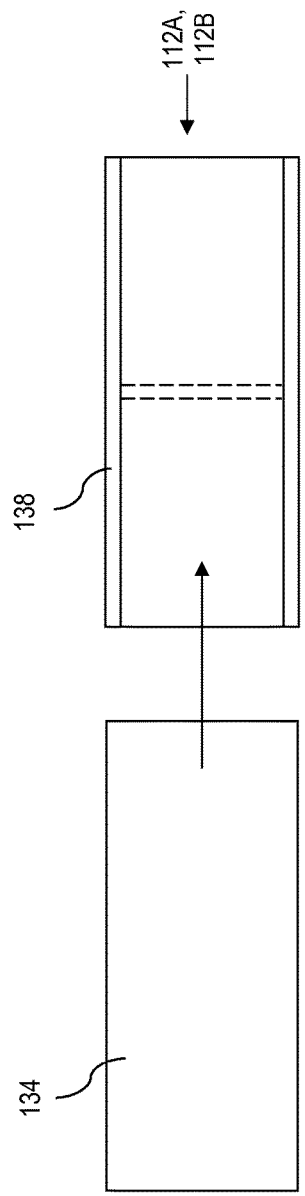
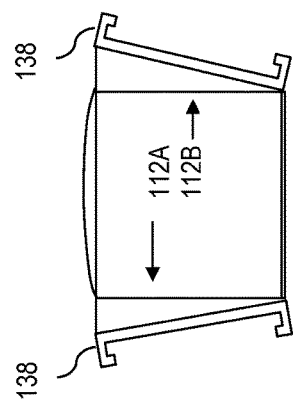
FIG. 5A
FIG. 5B

VEHICLE-MOUNTABLE DATA DISPLAY DEVICE

CROSS REFERENCE TO RELATED APPLICATIONS

This application claims the benefit of U.S. Provisional Patent Application Ser. No. 62/017,300, filed Jun. 26, 2014, entitled VEHICLE-MOUNTABLE DATA DISPLAY DEVICE, the disclosure of which is hereby incorporated by reference.

BACKGROUND

Various aspects of the present invention relate generally to displaying data, and more specifically displaying data, such as advertisements, on a vehicle.

Some companies rent space on billboards to advertise goods or services. However, the effectiveness of the advertising is limited to the number of consumers who can see the billboard. As such, some companies have rented advertising space on vehicles in the form of a relatively small billboard that is mounted on the top or side of the vehicle. Alternatively, some companies utilize vehicles for advertising in the form of wrap advertising, where the vehicle is completely or partially covered by an advertisement. Therefore, instead of waiting for consumers to pass a stationary advertisement, the advertisement can be taken to the consumers.

BRIEF SUMMARY

According to aspects of the present disclosure, a device is provided for displaying information such as an advertising or informational message. The device includes a mount and an enclosure coupled to the mount. The enclosure includes a first outward-sloped wall with a window therein. The enclosure also includes a second outward-sloped wall with a window therein, where the second outward-sloped wall is positioned opposite the first outward-sloped wall. A top surface is coupled between the first outward-sloped wall and the second outward-sloped wall. A first video display is positioned inside the enclosure such that a screen of the first video display faces the window of the first outward-sloped wall. Likewise, a second video display is positioned inside the enclosure such that a screen of the second video display faces the window of the second outward-sloped wall. A memory device stores information to be displayed on the first video display and the second video display.

In an optional configuration, the device further comprises at least one post coupled to the top of the enclosure. A shield is coupled to the enclosure via the at least one post. The shield overhangs the first outward sloped wall and the second outward sloped wall. As an example, the shield has a major surface that is larger than the top of the enclosure and includes an awning. In specific implementations, the shield can include a first awning that hangs over the first outward-sloped wall, and a second awning that hangs over the second outward-sloped wall.

In yet another optional configuration, a solar cell is provided. The solar cell can coupled to the shield, to a corresponding vehicle, etc. Also, a solar battery is electrically coupled to the solar cell and is electrically coupled to at least one of the first video display and the second video display.

In yet a further optional configuration, the device may further comprise a first panel coupled to the enclosure, e.g., via a hinge, track system, container for unfurling the panel, etc. The first panel may be positioned in a select one of a first position and a second position. In the first position, the first panel does not obscure the screen of the first video display, and in the second position, the first panel obscures the screen of the first video display. Likewise, the device may further comprise a second panel coupled to the enclosure, e.g., via a hinge, track system, container for unfurling the panel, etc. The second panel is analogous to the first panel, e.g., the second panel may be positioned in a select one of a first position and a second position. In the first position, the second panel does not obscure the screen of the second video display, and in the second position, the second panel obscures the screen of the second video display.

Any of the optional configurations can be included with the device in any combinations thereof.

BRIEF DESCRIPTION OF THE SEVERAL VIEWS OF THE DRAWINGS

FIG. 5A is a front schematic view of a configuration of an outward-sloped wall having a track system for sliding a panel in and out of cooperation with the outward-sloped wall to provide static messaging in lieu of, or in combination with a video display behind the window of the outward-sloped wall;

FIG. 5B is a side view of the track system of FIG. 5A, illustrating a lip that allows a panel to be secured to the outward-sloped wall;

DETAILED DESCRIPTION

According to various aspects of the present disclosure, a device for displaying information, such as an advertisement, informational message, combination thereof, etc., is provided. The device mounts to a vehicle (e.g., via a luggage rack on a vehicle such as a car). Moreover, the device includes an enclosure that houses video displays, which show data stored on a memory device through the windows of the enclosure. A shield protects the video displays and other electronics within the device from heat generated by sunlight to prevent overheating in hot environments. Further, the shield may act as a shade to allow the information displayed on the video display screens to be seen in daylight uses.

The device may be powered at least in part, by a solar cell coupled to the top of the shield. As such, while the shield protects the video display from heat and light, some of the light that the device is exposed to is converted into electricity and is stored in a solar battery to power the device. The device may also be powered by the vehicle, e.g., by the vehicle battery/batteries, generator, etc., to which the device is mounted. Therefore, if the solar battery runs low on stored power, then the device will still function.

Not all of the information that is displayed need be digital data shown on the video display screens. Instead, a passive panel may be coupled (or is otherwise mountable) to the enclosure, such as by a hinge, track system, or other suitable means, examples of which are described more fully herein. The panel includes static messaging or advertisement data (e.g., painted on, printed, affixed with decals, etc.). When the panel is down (in a first position), the panel will not obscure one of the video display screens when viewed from outside the enclosure. As such, an observer proximate to the enclosure can see the information on the video display screen unobstructed by the panel. However, when the panel is up (in a second position), the panel obscures one of the video display screens when viewed from outside the enclosure. That is, the static data on the panel is observable instead of (or in addition to) the data on the video display screen. In some embodiments, the video display(s) are used as a backlight for the panel, thus the message on the panel is observable with the addition of backlighting. In alternative embodiments, the video displays may be turned off, such as to conserve energy during daylight uses since the information on the panel is observable, e.g., in natural daylight. Still further, the static panels can combine with the video displays to create different messaging effects, either as distinct messages, or as a unified, overall message. Static information can also be applied to the shield, e.g., via a wrap.

Figure 1:
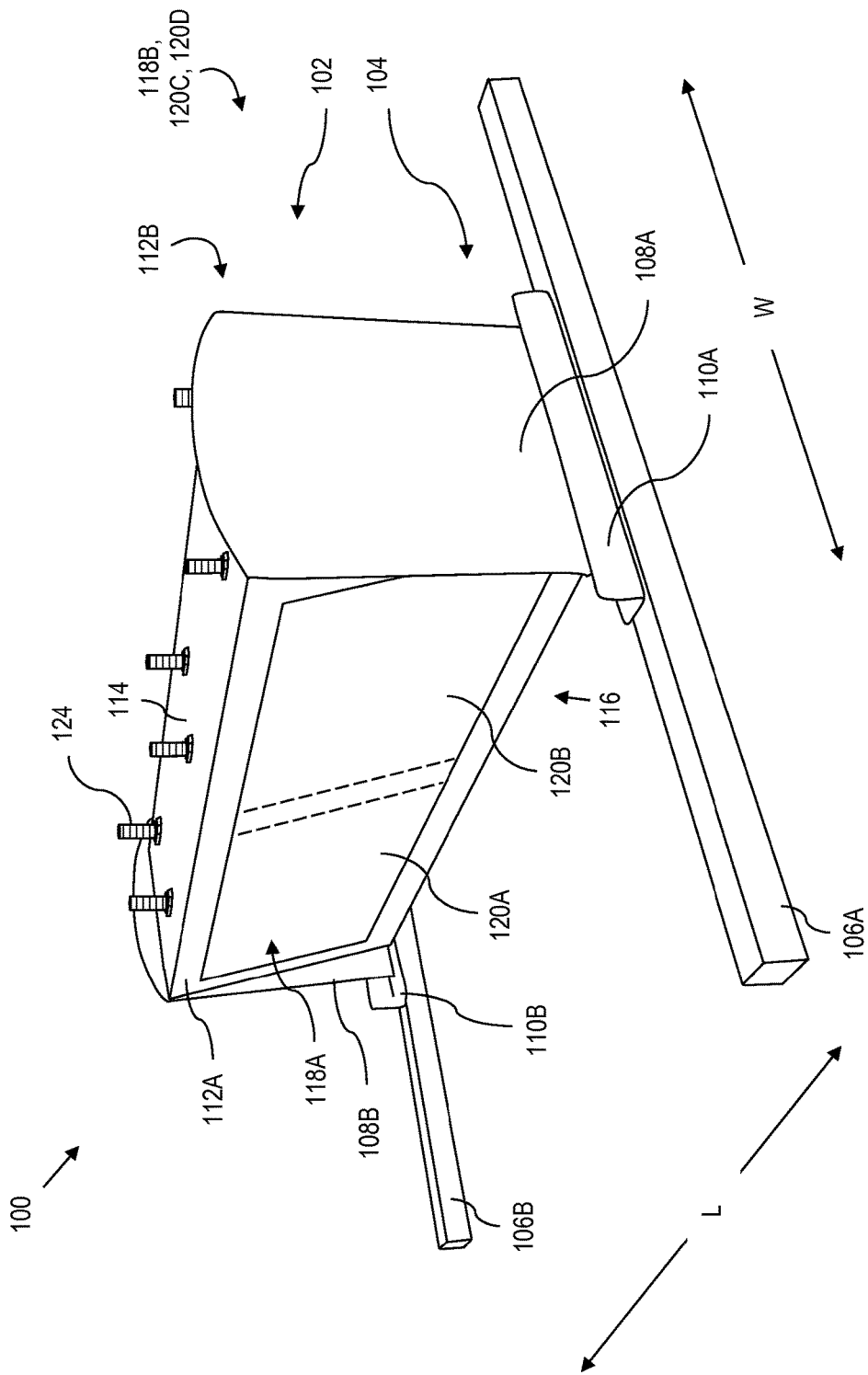
FIG. 1 is a perspective view of select components of a device including an enclosure coupled to a mount, according to various aspects of the present disclosure.

General Construction:

Turning now to the figures and in particular to FIG. 1, a perspective view illustrates a device 100 for displaying data, which includes an enclosure 102 coupled to a mount 104. The enclosure 102 has a major length that extends along a length dimension L. The mount 104 includes two bars 106A, 106B generally orthogonal to the enclosure 102, extending along a width dimension W as shown. However, the mount 104 may be implemented using any suitable mounting mechanisms. For example, the mount 104 can utilize suction cups, bolts or other fasteners, an adhesive, a clamping mechanism, loops with ropes or cables to tie the device 100 to a vehicle, etc., in addition to, or in lieu of the two bars 106A, 106B.

The enclosure 102 includes opposing end walls 108 that extend along the width dimension W. More particularly, the opposing end walls 108 are illustrated as a first end wall 108A, and a second end wall 108B. The first end wall 108A includes a bracket 110A that securely connects the enclosure 102 to the mount 104, e.g., by bolting to the first bar 106A. Analogously the second end wall 108B includes a bracket 110B that securely connects the enclosure 102 to the mount 104, e.g., by bolting to the second bar 106B.

The enclosure 102 also includes opposing outward-sloped walls 112 that extend along the length dimension L. More particularly, the outward-sloped walls 112 are illustrated as a first outward-sloped wall 112A, and a second outward sloped wall 112B. As illustrated, the outward-sloped walls 112 are oriented such that the upper edge is further from a centerline of the enclosure taken along the length dimension L compared to a lower edge. The particular angle will depend upon the specific application, and is provided to aid in viewability by people proximate to the device 100 when the device 100 is mounted on a suitable vehicle, as will be described in greater detail herein. There may be certain situations where the outward-sloped walls 112 may be configured such that the lower edge is further from a centerline of the enclosure taken along the length dimension L compared to a upper edge, e.g., where the anticipated viewer is positioned higher than the device 100 when the device is mounted on a suitable vehicle.

The enclosure 102 also includes a top surface 114 and a bottom surface 116. The opposing end walls 108A, 108B connect the two opposing outward-sloped walls 112A, 112B in cooperation with the top surface 114 and the bottom surface 116, thus forming a preferably water-tight sealed enclosure. The top 114 and the bottom 116 thus each span between, and form a sealing relationship with the two opposite facing end walls 108A, 108B and the opposing outward-sloped walls 112A, 112B.

At least one window 118 is provided in each outward-sloped wall 112. For sake of discussion, the windows 118 are illustrated as a first window 118A in the outward-sloped wall 112A, and a second window 118B (not shown) in the outward-sloped wall 112B. Windows may also be provided in the two opposite facing end walls 108A, 108B. In practice, any number of windows 118 can be provided in each of the walls (two opposite facing end walls 108A, 108B and the opposing outward-sloped walls 114A, 114B) as the specific application dictates.

Behind each window 118, is at least one video display 120. Each video display 120 is oriented such that a screen of the video display faces the window of the corresponding wall, e.g., faces outside the enclosure through the corresponding window. For instance, as illustrated, the example device 100 includes a first video display 120A and a second video display 120B oriented such that the screen of the first video display 120A and the screen of the second video display 120B face towards the first window 118A so as to be viewable by an observer facing the first window 118A and correspondingly, the first outward-sloped wall 112A. Likewise, a third video display 120C and a fourth video display 120D are oriented such that the screen of the third video display 120C and the screen of the fourth video display 120D face towards the second window 118B so as to be viewable by an observer facing the second window 118B and correspondingly, the second outward-sloped wall 112B.

Figure 2:
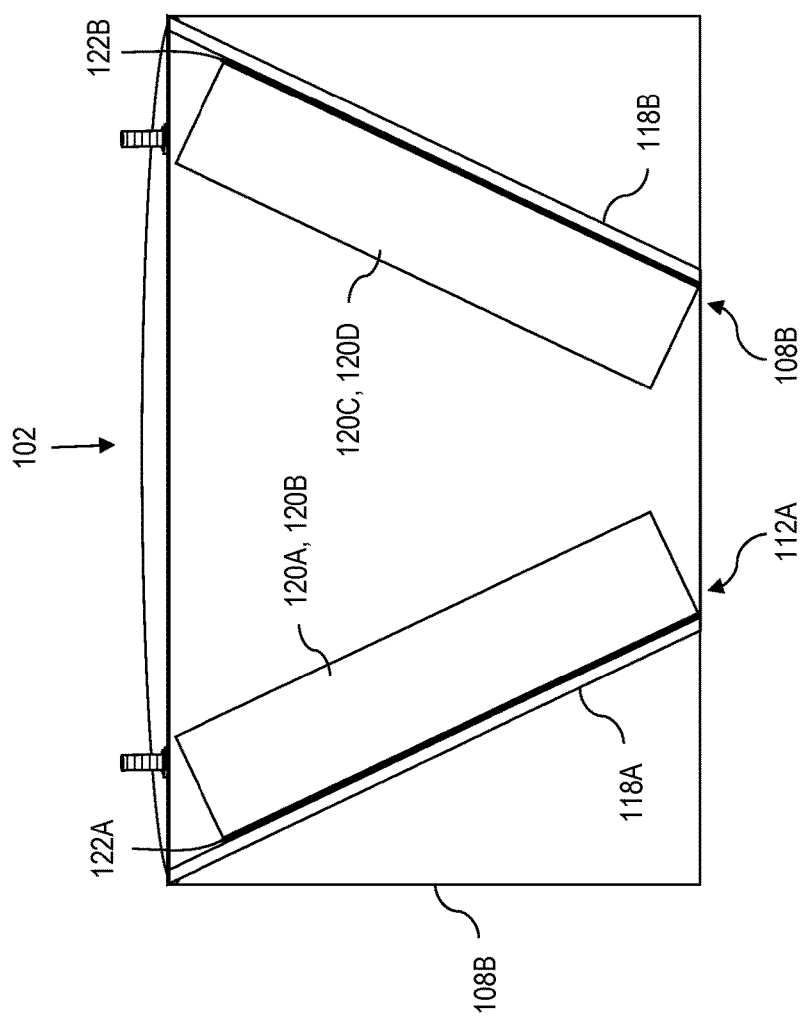
FIG. 2 is a side cross-sectional view of the device of FIG. 1, with an end panel cut away to better clarify the configuration of the windows and video displays in the device of FIG. 1.

Turning now specifically to FIG. 2, a cross-sectional view of the device 100 is illustrated. This view is taken looking at the end of the device 100 along the Length dimension L (cross-section in the width/height dimensions). Moreover, the view in FIG. 2 essentially removes the first end wall 108A to better illustrate the certain aspects of the structure of the device 100. As illustrated, the first outward-sloped wall 112A is angled, i.e., not at 90 degrees, such that the upper end extends out slightly more than the bottom end of the wall. Likewise, the second outward-sloped wall 112B, which is positioned opposite the first outward-sloped wall 112A, is analogously angled, i.e., not at 90 degrees, such that the upper end also extends out slightly more than the bottom end of the wall. The exact angle can vary, e.g., depending upon the height of the vehicle to which the device 100 is mounted. The outward angle increases viewing clarity and assists in reducing glare on the video displays in daylight.

As noted above, the first outward-sloped wall 112A has at least one window 118A therein. Likewise, the second outward-sloped wall 108B has at least one window 118B therein. Further, the enclosure 102 houses one or more video displays 120. More particularly, for purposes of illustration and not by way of limitation, there are two video displays 120A, 120B that are positioned side-by-side and are viewable through the window 118A of the first outward-sloped wall 112A. Likewise, there are two video displays 120C, 120D positioned side-by-side that are viewable through the window 118B of the second outward-sloped wall 112B. As such, whatever is shown on the video displays 120 (e.g., an advertisement, an emergency alert, etc.) may be seen through the corresponding windows 110A, 110B.

In an illustrative implementation, each video display 120 is sealingly mounted to an associated window 118, such as using a suitable seal 122, e.g., adhesive, high viscosity window weld, gasket, or other suitable sealing agent to keep dirt and debris from penetrating between the window 110 and the video display 112. The seal 122 also serves to secure the video displays 120 within the enclosure 102. Thus, in the illustrated implementation, the video displays 120A, 120B are adhered to the corresponding window 118A via seal 122A. Likewise, the video displays 120C, 120D are adhered to the corresponding window 118B via seal 122B. However, other arrangements may be utilized to position or otherwise secure the video displays 120 within the enclosure 102.

Turning back to FIG. 1, in an illustrative implementation, the enclosure 102 forms a sealed container. Thus, the opposing end walls 108A, 108B are sealingly connected to the opposing outward-sloped walls 112A, 112B. The window 118A, e.g., clear Plexiglas or other transparent surface, is sealingly installed into the first outward-sloped wall 112A. Likewise, the window 118B, e.g., also clear Plexiglas or other transparent surface, is sealingly installed into the second outward-sloped wall 112B. The top surface 114 is sealingly connected to the upper portion of the opposing end walls 108A, 108B and opposing outward-sloped walls 112A, 112B. Likewise, the bottom 116 is sealingly connected to the lower portion of the opposing end walls 108A, 108B and opposing outward-sloped walls 112A, 112B.

Referring generally to FIG. 1 and FIG. 2, there are two video displays 120 per window 118 for a total of four video displays. (Two video displays 120A, 120B, on the first outward-sloped wall 112A and two video displays 120C, 120D on the second outward-sloped wall 112B.) However, any reasonable number of separate windows 118 and corresponding video displays 120 may be utilized per wall of the enclosure, in any reasonable configuration. As a few non-limiting examples, there can be one window and one video display per side. There may be multiple video displays in one window and the same or a different number of video displays in the opposite window. As yet another example, there can be one video display that shows data through several windows on the same side of the enclosure 102.

Shield:

Referring specifically to FIG. 1, in an optional configuration, the top 114 supports at least one post 124. Each post 124 may be completely threaded, partially threaded, or not threaded at all. The posts 124 are for supporting a shield, which is described in greater detail herein.

Figure 3:
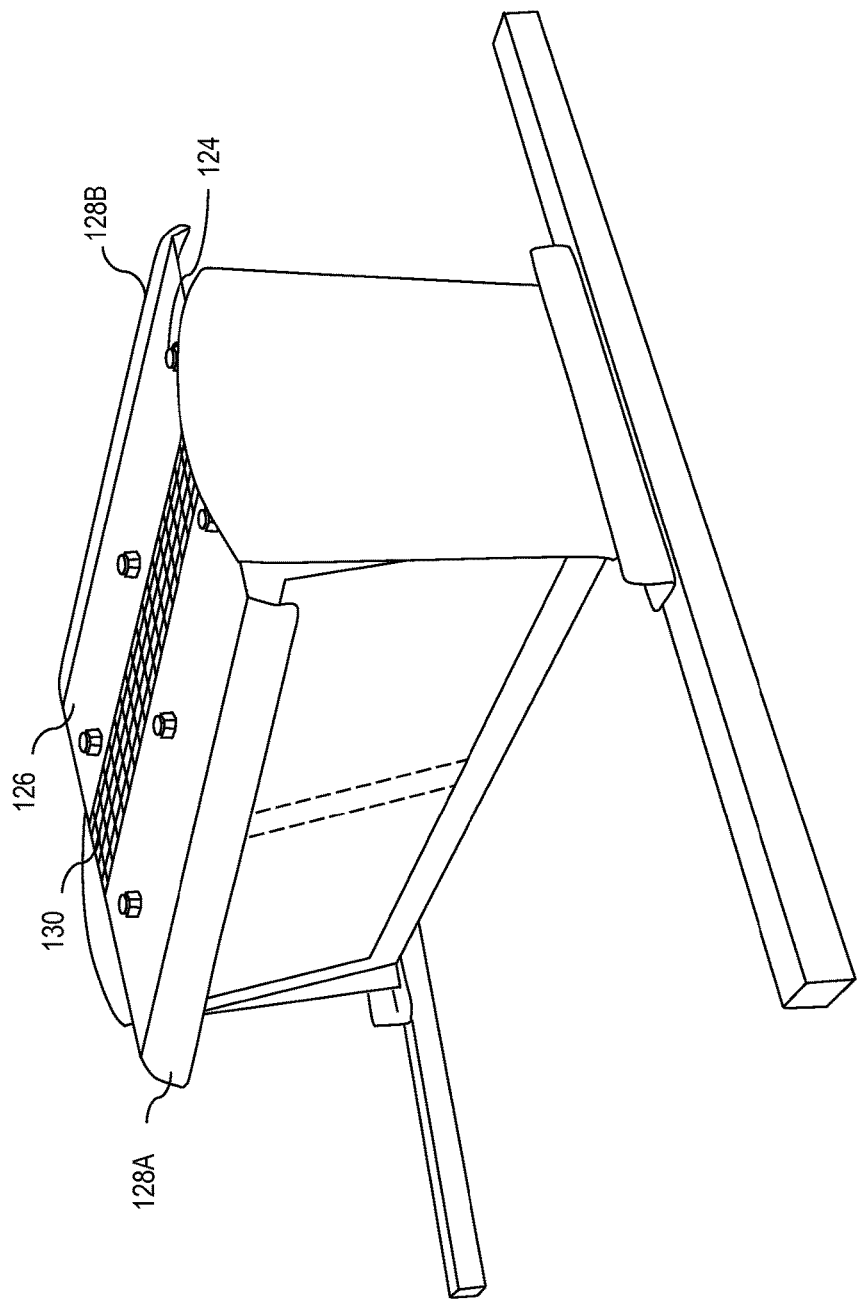
FIG. 3 is a perspective view of the device of FIG. 1 further including a shield coupled to the enclosure, according to various aspects of the present disclosure.

Turning now to FIG. 1 and FIG. 3, a shield 126 couples to the enclosure 102 via the posts 124. Any suitable means may be used for coupling the shield 126 to the posts 124 (e.g., threaded posts and threaded holes in the shield, locking nuts, welding tacks, epoxy, etc.). As such, the shield 126 is coupled to, and spatially separated from the top 114 of the enclosure 102 by the posts 124.

The shield 126 shades the enclosure 102 and the video displays 120 so that light from a light source (e.g., the sun, artificial lights, etc.) above the device 100 will not washout whatever is being shown on the video displays 120.

To aid in the shading, the illustrated shield 126 includes at least one awning 128 to provide more shade when the light source is not directly above the device 100. In practice, the awning 128 is optional. In an illustrative implementation, the shield 126 includes a major surface such that the shield 126, including its awning 128, is larger than the top 114 of the enclosure 102. The awning 128 of the shield 126 is thus dimensioned to shade the video displays 120 within the enclosure 102 from overhead light. In this regard, a first awning 128A hangs over the edge of the first outward angled wall 112A, and a second awning 128B hangs over the edge of the second outward angled wall 112B. Moreover, each awning 128 includes a lip (downward bend) that bends downward. By way of illustration and not by way of limitation, the shield 126 may sit approximately one inch (2.54 centimeters) above the top 114. Likewise the, awnings 128A, 128B can extend approximately two to two and one half (5.08-6.35 centimeters) over the edge of the top 114 extending out from the outward angled walls 112A, 112B. The awning 128 thus increases daytime viewability of the content displayed on the screens of the video displays 120, as observed through the windows 118.

The shield 126 also disperses heat from sunlight such that the heat from the sunlight does not adversely affect operation of the video displays 120. More particularly, because the shield 126 is spaced from the enclosure 102 by the posts 124, the shield 126 can protect the video displays 120 and other electronic components in the enclosure 102 from the sun's heat, which will reduce the chances of overheating of electronics contained within the enclosure. This protection from heat provided by the shield 126 is different from a heat sink, because a heat sink disperses heat generated by the electronic components (e.g., video displays 120), while the shield 126 prevents other outside heat from reaching the electronic components, e.g., displays and other optional electronics within the enclosure 102.

The shield 126 may be used as a surface to apply a "wrap", e.g., to provide static messaging. The wrap may be provided across the entire shield 126, the messaging may be displayed on the awnings 128, on the top portion, part of the top portion, combinations thereof, etc.

As best illustrated in FIG. 3, the shield 126 further includes a solar cell 130 which may be implemented as one or more individual solar cells, a solar panel, etc. Light from a light source such as the sun is converted into electrical current by the solar cell 130. A power-distribution and control system is discussed in greater detail in reference to FIG. 7.

Figure 4:
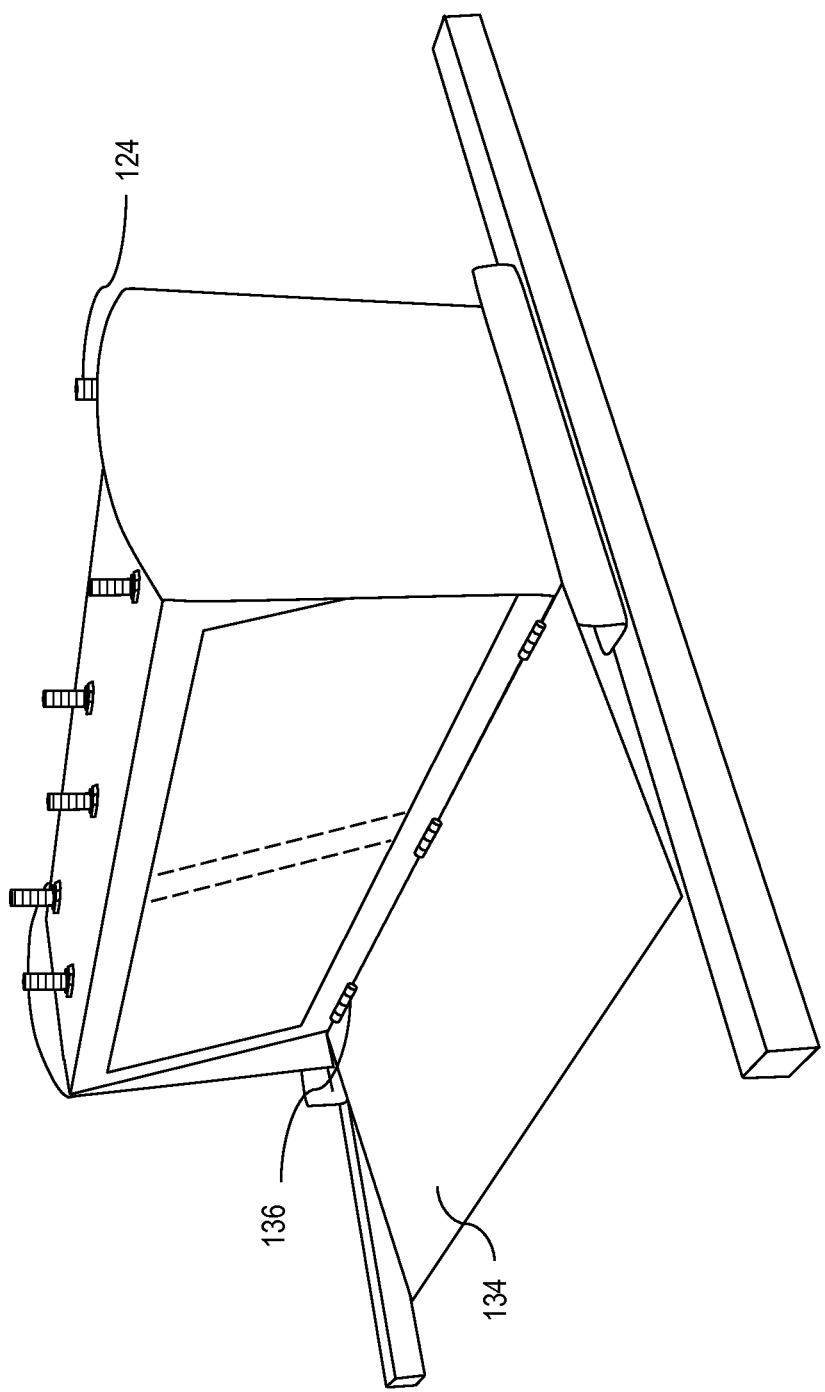
FIG. 4 is a perspective view of the device of FIG. 1 illustrating a hinged panel, according to various aspects of the present disclosure.

Combination Video Display/Static Display:

Referring to FIG. 4, in an example optional implementation, the enclosure 102 includes a first panel 134 coupled to the enclosure 102 by a hinge 136. In this embodiment, the shield 126 can be included, but is not shown for clarity of explanation. The first panel 134 may be positioned in a select one of a first position and a second position. In the first position, the first panel 134 does not cover a corresponding window 118 and video display(s) 120. As such, in the first position, the first panel 134 does not obscure the screen of a corresponding video display 120 when viewed by an observer. In the second position, the first panel 134 covers the window 118 and video display(s) 120. Thus, in the second position, the first panel 134 obscures the screen of a corresponding video display 120. As used herein, to "obscure" does not require complete concealment. For instance, an image on a screen of the display may be visible through the first panel 134, e.g., to augment the information contained on the first panel 134. Also, the first panel 134 may allow light from the screens to pass through, e.g., to provide backlighting of the information on the first panel. In yet further implementations, the first panel 134 may be opaque so that the screens of the video displays 120 cannot be viewed by an observer.

Because the walls of the enclosure are outward sloped, to get from the first position (generally horizontal) to the second position, the hinge may swing less than ninety degrees.

For instance, as shown in FIG. 4, the panel 134 is in a first position where the panel 134 does not cover the window 118. Thus, the video display(s) 120 can be seen by passersby. However, when the panel 134 is in the second position, the panel 134 is pivoted along the hinge 136 so that the panel 134 covers the corresponding window 118 and hence, any video display(s) 120 viewable though the window 118. As such, passersby can see any static information, e.g., messaging, provided on the panel 134.

In illustrative implementations, the hinged panel can be locked into place in the second position, e.g., when installed in a position covering the window 118, e.g., using a suitable latch, pin, lock, etc. Likewise, in certain implementations, the hinged panel 134 is also locked when the panel 134 is in the first position, i.e., a retracted position not obstructing the windows 118.

The opposite side, not shown in FIG. 4, includes an analogous second panel 134 to selectively cover one or more video displays 120 on that side of the enclosure 102. Thus for instance, the panels 134 can be used to display a static advertisement in conditions such as bright sun that would otherwise make the video displays hard to see. As another example, the panels 134 can be used to display a static advertisement in times where there is a motivation to conserve energy. The panels 134 also allow the use of a specific message, e.g., "Off Duty" to be displayed in a manner that is clearly different from messages are presented on the video display(s) 120. Still further, the panels 134 can be used to set up two (or more) classes of advertiser. For instance, an advertising customer can rent a "day" package where the message is presented on a panel 134 that covers the video displays 120 (panels 134 in the second position) for a period of time, e.g., morning, daylight hours, etc. At the end of the period, e.g., after 5:00 pm, the panels 134 can be dropped to the first position to present advertisements on the video display screens, e.g., for the same or different advertising customers.

Referring to FIG. 5A and FIG. 5B, in an alternative optional configuration, the panel 134 may slide into place, i.e., not hinged as shown in FIG. 4. The ability to slide the panels 134 into place allows for easy replacement of panels 134 (e.g., with different static data). For instance, the enclosure 104 includes include a track system 138 that allows the panel 134 to be slid into position and locked into place. Preferably, the track system 138 is not obstructed by the first end wall 108A and second end wall 108B (shown in FIG. 1). Alternatively, the panels 134 can be flexible/flexed to fit into the track system 138. When slid into position (and optionally locked), the panels 134 cover the video displays 120 from view through the corresponding window 118. When the panel 134 is unlocked and removed from the track system 138, the video displays 120 are once again viewable by an observer. Thus, the first position corresponds to the panels 134 removed from the track system 138. The second position corresponds to the panels 134 slid into the track system 138.

As such, in a first position, the panel 134 does not cover a corresponding window 118 and video display(s) 120. In a second position, where the panel 134 is slid into the track system 138, the panel 134 covers the window 118 and video display(s) 120. As with the example of FIG. 4, in practice, the track system 138 is actually provided on both sides of the enclosure such that a first panel can cover the first window 118A, and a second panel 134 can cover the second window 118B. This provides the ability to include a static display on one or both sides of the enclosure 102, to remove the panel(s) 134 from interfering with the video displays 120, or any combination thereof.

In some embodiments, when the panel(s) 134 is/are in the second position (regardless of whether the panel 134 is hinged or slid into place), the video display(s) 120 can act as a backlight. Alternatively, the video displays 120 can be turned off to conserve power. Yet further, the video displays 120 can be used to augment a static message displayed on the panel 134 by presenting information viewable through the corresponding panel 134.

In practice, other techniques can be utilized to selectively position each panel 134 in a first position that does not obstruct the window 118, and a second position that covers the window 118. As a few additional example implementations, where the panel 134 is rigid, the panel 134 may hinge from the bottom as shown in FIG. 4, or hinge from the top of the enclosure (not shown). Moreover, the track system 138 can allow the panel 134 to slide into place via tracks or guides with an entrance positioned at the top, bottom or either side, etc.

Figure 6:
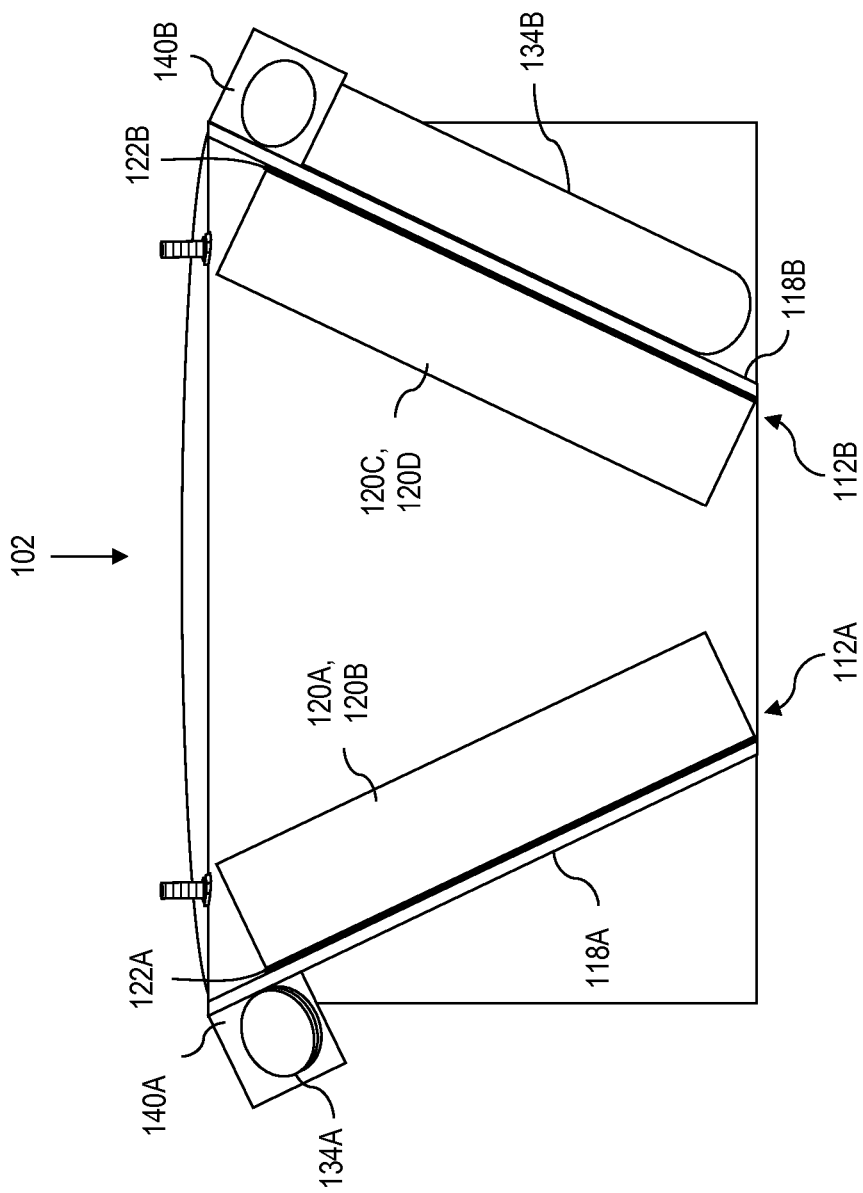
FIG. 6 is a side cross-sectional view of the device of FIG. 1, with the addition of containers for furling and unfurling panels to selectively cover or reveal the video display screens.

Referring to FIG. 6, in yet another optional configuration where the panel 134 is not rigid, e.g., a cloth banner, plastic or vinyl, etc., the panel 134 may be furled up into a container 140 (e.g., within a box, on a roller, etc.) until time to deploy the panel 134, in which case the panel 134 is unfurled across the corresponding window 118. For instance, the panel 134A is shown furled up inside the container 140A on the left side (outward-sloped wall 112A) so that the video displays 120A, 120B are unobstructed through the window 118A by the panel 134A. However, the panel 134B is shown unfurled from the container 140B, thus covering the window 118B on the right-side (outward-sloped wall 108B). Here, the panel 134B is obstructing the view of the video displays 120C, 120D through the corresponding window 118B.

Moreover, the device 100 can include more than one panel 134 per side. For example, there can be two panels 134 per side. As another example, there can be a panel 134 associated with each video display, each window, etc. If there are panels on both sides of the enclosure, the number of panels on each side does not need to be equal.

Figure 7:
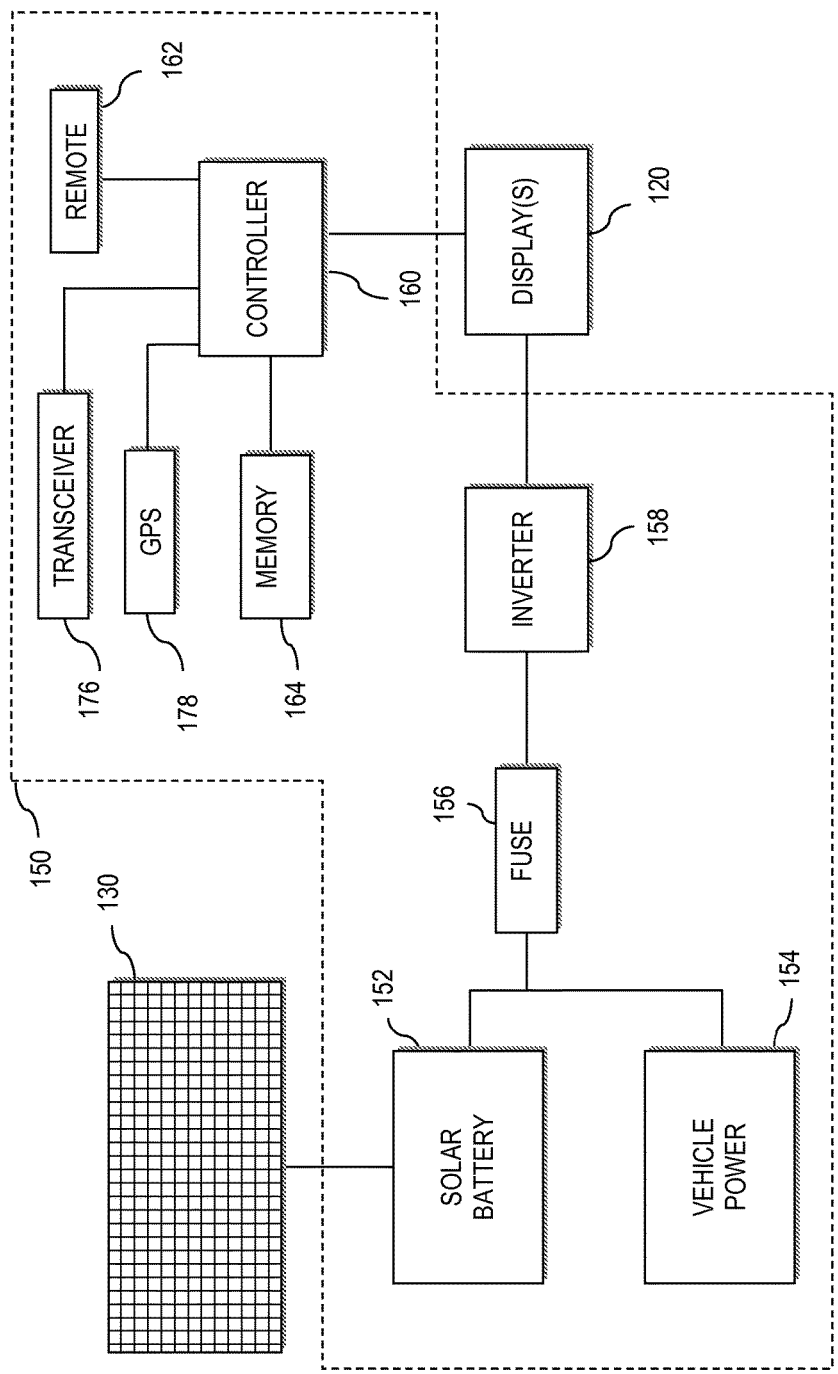
FIG. 7 is a block diagram illustrating a power-distribution and control scheme, according to various aspects of the present disclosure.

Power Distribution and Control System:

FIG. 7 is a block diagram of a power-distribution and control system 150 for powering the device (100, FIG. 1). The solar cell 130 (shown as a solar panel on the shield 126 in FIG. 3) converts light (natural, artificial, or both) into an electrical current. The solar panel 130 (where utilized) is electrically coupled to a solar battery 152, which stores power generated (and optionally regulates power) by the solar cell 130. The solar battery 152 then feeds the power to one or more of the video displays 120. Further, a direct-current power source 154 (vehicle power from one or more vehicle batteries, etc.) can be tied in parallel with the solar battery 152 to provide an alternate source of power to the device 100. The direct-current power source 154 may comprise a conventional vehicle battery, a high current battery, a set of batteries, e.g., one conventional battery and one or more an extra batteries in the trunk of the vehicle, etc.

In some embodiments, the power-distribution and control system 150 includes a fuse 156 coupled between the solar battery 152 and the video displays 120. The fuse 156 ensures that the video displays 120 do not receive too much current. In various embodiments, the power-distribution and control system includes an inverter 158 coupled between the solar battery 152 and the video displays 120 to change direct current from the solar battery 152, the vehicle power source 154, or both into alternating current for the video displays 120. In numerous embodiments, both the fuse 156 and the inverter 158 are used.

In certain embodiments, a controller 160 is provided. The controller 160 enables control over the video displays 120. For instance, the controller 160 can be used to set the mix, color, adjust hue, saturation, brightness, contrast, backlighting intensity, etc. By way of example, the controller 160 can be used to set the NITS (brightness) of the video display when implemented as LED display devices. In this regard, a remote control 162 is optionally provided, which can be wired to a convenient location, e.g., within a trunk compartment of the vehicle, within the interior of the vehicle, e.g., on a dashboard by the driver's seat, etc. The remote control 162 allows at least one user adjustment to be made to the video displays 120. For instance, a user may adjust the brightness of the displays for daytime use, but back down the brightness for night-time use by controlling the video displays 120 via the remote control 162, e.g., which can be implemented as a rotary control, slide control, control panel with display and input/output (I/O) etc.

To display information on the video displays 120, a memory device 164 provides digital data to the video displays 120 via the controller. The memory may alternatively directly couple to the displays 120. Moreover, a video signal can pass through one or more splitters, buffers, amplifiers, etc. (e.g., schematically illustrated by the controller 160) to maintain a quality video signal. In this regard, where there are two video displays per side, all four video displays may display the same message. Alternatively, the video displays can be split up such that different messages are simultaneously shown on different video displays. Moreover, a relatively large screen can be subdivided so that multiple advertisements appear on a single screen. Additional components can be connected to the controller 160, including an optional transceiver 176, which may be a receiver, transmitter, or combination thereof. Also, an optional positioning system 178, e.g., a global positioning system (GPS) can be integrated with the controller 160, e.g., to display geographically relevant advertising.

Figure 8:
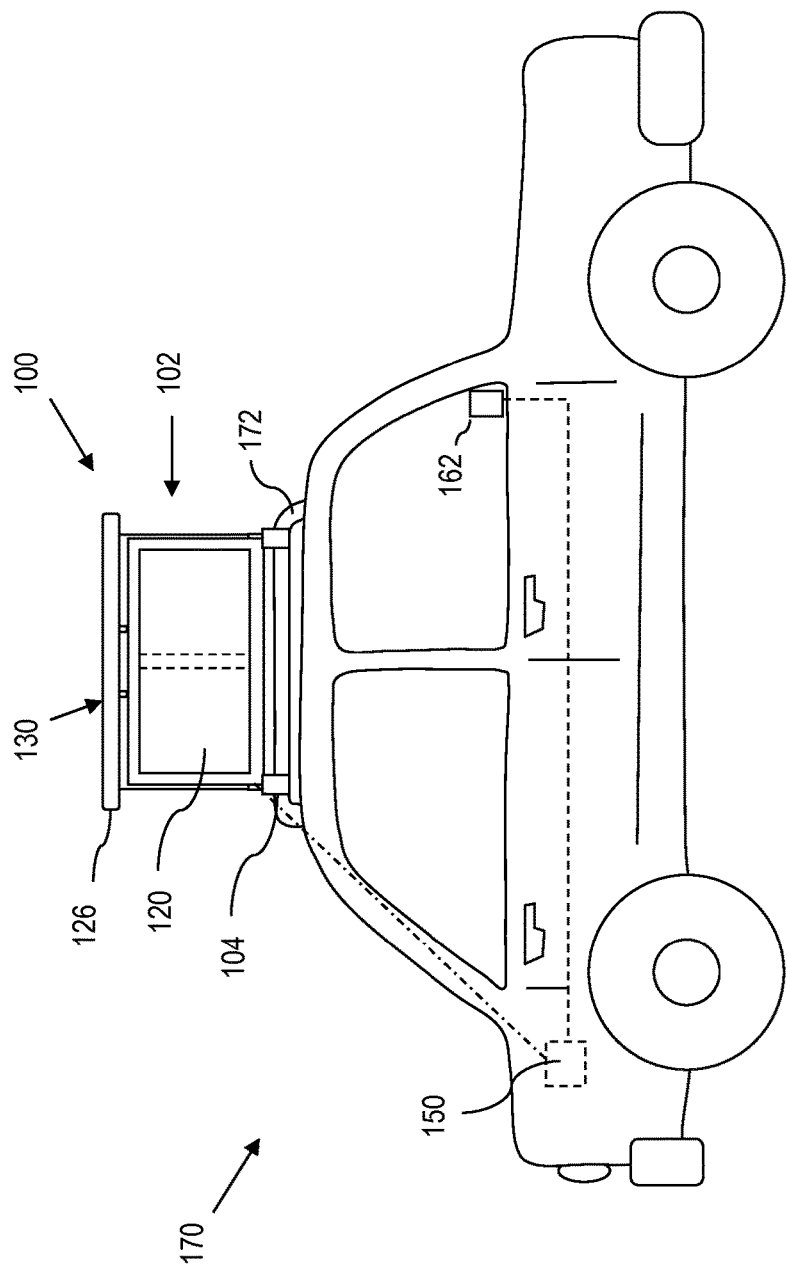
FIG. 8 is a side view of a device for displaying data mounted to a luggage rack of a vehicle, according to various aspects of the present disclosure.

FIG. 8 illustrates an example implementation of the device 100 coupled to a vehicle 170. The mount 104 fits easily to a securement, such as a custom bracket. Alternatively, a luggage rack 172 may be used to secure the mount 104 into place.

In this illustrative example, the power-distribution and control system 150 includes a memory device 164 (e.g., Flash memory, RAM, ROM, hard drive, USB drive, DVD played by a suitable player, CD played by a suitable player, etc.), which is communicably coupled to the video displays 120 to provide data which is to be shown on the video displays 120. As shown, the memory device 164 is located in a trunk of the vehicle 170; however, the memory device 164 may be located anywhere (e.g., in a cab of the vehicle 170 with the driver, in the enclosure 102, etc.). Further, the memory device 164 may be coupled to the video displays 120 through wired communication or wireless communication.

The memory device 164 may include one or more sets of data to be shown on the video displays 120. For example, one set of data may be an animated advertisement; a second set of data may be a non-animated advertisement; and a third data set may be solid white to be used as a backlight. The user may control which of the sets of data is displayed through controls within the cab of the vehicle, controls on the enclosure 102, controls in the trunk of the vehicle, wireless or wired controls, etc.

Moreover, a wireless communications device 176 may be coupled to the memory device 164, e.g., via the controller 160 so wireless communication may be used to update a data set on the memory device 164, to add a new set of data to the memory device 164, to remove a data set from the memory device 164, to override the data from the to be shown on the video displays 120, or combinations thereof. For example, if a child is missing, information about an Amber alert may be wirelessly communicated to the memory device 164, so the Amber alert may be shown on the video displays 120. The wireless communications device 176 may additionally (or alternatively) comprise a short range transmitter, e.g., a radio frequency modulator. In this regard, the wireless communication device 176 can interact with the video display to provide an interactive experience. For instance, the video display may provide a message that says, "tune your radio to frequency 999.9 FM to receive a special message". Correspondingly, the wireless communication device 176 can simultaneously transmit a message such as an advertisement, special offer, coupon, instruction, offer a benefit, etc. This allows the system to correlate the video display of an advertisement to the time of receipt of the message, coupon, etc. that is transmitted by the wireless communications device 176. Also, using location tracking such as a global positioning system (GPS) 178 connected to the controller 160, the collected data can be further correlated to location.

Further, the solar battery 152 is shown in the trunk of the vehicle, but the solar battery 152 may be kept in any appropriate place.

In practice, the features set out herein can be mixed and combined in any reasonable manner. For instance, the structures, methods and features in any of the FIGURES can be combined as desired. For instance, any of the panel configurations described with reference to FIGS. 4-6 can be combined with the shield of FIG. 3, etc. Moreover, the video displays 120 can be any size, and of any suitable technology, including Light Emitting Diode (LED), Liquid Crystal Display (LCD), Plasma Display Panel (PDP), etc.

Some embodiments include a mixture of the elements of the embodiments discussed above. For example, some embodiments may include two video displays per side, include the shield, and have the memory device in the enclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A device for displaying information, the device comprising:
    a mount;
    an enclosure coupled to the mount, the enclosure including:
        a first outward-sloped wall with a window therein;
        a second outward-sloped wall with a window therein, wherein the second outward-sloped wall is positioned opposite the first outward-sloped wall, wherein the outward-sloped walls are oriented such that:
            an upper edge of the first outward-sloped wall is further from a centerline of the enclosure taken along a length dimension compared to a lower edge of the first outward-sloped wall; and
            an upper edge of the second outward-sloped wall is further from a centerline of the enclosure taken along a length dimension compared to a lower edge of the second outward-sloped wall; and
        a top coupled between the first outward-sloped wall and the second outward-sloped wall;
    a first video display inside the enclosure, wherein a screen of the first video display faces the window of the first outward-sloped wall;
    a second video display inside the enclosure, wherein a screen of the second video display faces the window of the second outward-sloped wall;
    a memory device that stores information to be displayed on the first video display and the second video display;
    at least one post coupled to the top of the enclosure, wherein the at least one post extends vertically from the top of the enclosure;
    a shield coupled to the enclosure via the at least one post, wherein:
        the shield overhangs the first outward sloped wall and the second outward sloped wall;
        the shield provides shade to the video displays; and
        the shield is spatially separated above the top of the enclosure;
    a solar cell; and
    a solar battery electrically coupled to the cell and electrically coupled to at least one of the first video display and the second video display.

2. The device of claim 1, wherein the shield has an awning that extends over an upper edge of the outward-sloped walls, and includes a lip that bends downward.

3. The device of claim 1, wherein the shield disperses heat from sunlight such that the heat from the sunlight does not adversely affect operation of the first video display and the second video display.

4. The device of claim 1 further comprising:
    a first panel coupled to the enclosure such that the first panel is positioned in a select one of a first position and a second position, wherein in the first position, the first panel does not obscure the screen of the first video display, and in the second position, the first panel obscures the screen of the first video display.

5. The device of claim 4 further comprising:
    a hinge coupled to the first panel, which enables the first panel to transition between the first position and the second position.

6. The device of claim 4 further comprising:
    a track system along the first outward-sloped wall that enables the first panel to be slid into the second position.

7. The device of claim 4 further comprising:
    a container positioned along an upper portion of the first outward-sloped wall that includes the first panel to be unfurled so define the second position, and furled into the container to define the first position.

8. The device of claim 4, wherein:
    the first video display is active when the first panel covers the first video display such that the first video display acts as a backlight for the first panel.

9. The device of claim 1 further comprising:
    a controller programmable by a user to adjust a brightness of the first and second video displays.

10. The device of claim 1 further comprising a wireless communications device coupled to the memory device via a controller, wherein the wireless communications device is operative to receive a message including data to be displayed on the first video display.

11. The device of claim 1 further comprising a wireless communications device coupled to the memory device via a controller, wherein the wireless communications device is operative to transmit a message via a short range transmitter, wherein the first video display indicates information as to how to tune into the message transmitted by the short range transmitter.

12. A device for displaying information, the device comprising:
    a mount;
    an enclosure coupled to the mount, the enclosure including:
        a first outward-sloped wall with a window therein;
        a second outward-sloped wall with a window therein, wherein the second outward-sloped wall is positioned opposite the first outward-sloped wall, wherein the outward-sloped walls are oriented such that:
            an upper edge of the first outward-sloped wall is further from a centerline of the enclosure taken along a length dimension compared to a lower edge of the first outward-sloped wall; and an upper edge of the second outward-sloped wall is further from a centerline of the enclosure taken along a length dimension compared to a lower edge of the second outward-sloped wall; and
a top coupled between the first outward-sloped wall and the second outward-sloped wall;
a first video display inside the enclosure, wherein a screen of the first video display faces the window of the first outward-sloped wall;
a second video display inside the enclosure, wherein a screen of the second video display faces the window of the second outward-sloped wall;
a first panel coupled to the enclosure such that the first panel may be positioned in a select one of a first position and a second position, wherein in the first position, the first panel does not obscure the first video display, and in the second position, the first panel obscures the first video display;
a second panel coupled to the enclosure such that the second panel may be positioned in a select one of a first position and a second position, wherein in the first position, the second panel does not obscure the second video display within of the enclosure, and in the second position, the second panel obscures the second video display;
a post coupled to the top of the enclosure, wherein the post extends vertically from the top of the enclosure;
a shield coupled to the post, wherein:
the shield is larger than the top of the enclosure and includes an awning;
the shield provides shade to the video displays; and
the shield is spatially separated above the enclosure;
a solar cell coupled to the shield; and
a solar battery electrically coupled to the cell and electrically coupled to at least one of the first video display and the second video display.

13. The device of claim 12, wherein the shield disperses heat from sunlight such that the heat from the sunlight does not adversely affect operation of the first video display and the second video display.

14. The device of claim 12, wherein:
the first video display is active when the first panel obscures the first video display such that the first video display acts as a backlight for the first panel.

15. The device of claim 12 further comprising a select one of:
a hinge that enables the first panel to transition between the first position and the second position;
a track system along the first outward-sloped wall that enables the first panel to be slid into the second position; and
a container positioned along an upper portion of the first outward-sloped wall that includes the first panel to be unfurled so define the second position, and furled into the container to define the first position.

16. The device of claim 12 further comprising:
an inverter coupled between the first video display and the solar battery; and
a fuse coupled between the inverter and the solar battery.

17. The device of claim 12 further comprising:
a wireless communications device coupled to a memory device, wherein the wireless communications device is operative to receive a message including data to be video displayed on the first video display.

18. The device of claim 12 further comprising:
a wireless communications device coupled to a memory device, wherein the wireless communications device is operative to transmit a message via a short range transmitter, wherein the first video display indicates information as to how to tune into the message transmitted by the short range transmitter.

19. A device for video displaying information, the device comprising:
a mount;
an enclosure coupled to the mount, the enclosure including:
a first outward-sloped wall with a window therein;
a second outward-sloped wall with a window therein, wherein the second outward-sloped wall is positioned opposite the first outward-sloped wall, wherein the outward-sloped walls are oriented such that:
an upper edge of the first outward-sloped wall is further from a centerline of the enclosure taken along a length dimension compared to a lower edge of the first outward-sloped wall; and
an upper edge of the second outward-sloped wall is further from a centerline of the enclosure taken along a length dimension compared to a lower edge of the second outward-sloped wall; and
a top coupled between the first outward-sloped wall and the second outward-sloped wall;
a first video display inside the enclosure, wherein the first video display faces outside the enclosure through the window of the first outward-sloped wall;
a second video display inside the enclosure, wherein the second video display faces outside the enclosure through the window of the second outward-sloped wall;
a first panel coupled to the enclosure such that the first panel may be selectively positioned in a first position and a second position, wherein in the first position, the first panel does not cover the first video display within of the enclosure, and in the second position, the first panel covers the first video display within of the enclosure;
a second panel coupled to the enclosure such that the second panel may be selectively positioned in a first position and a second position, wherein in the first position, the second panel does not cover the second video display within of the enclosure, and in the second position, the second panel covers the second video display within of the enclosure;
a post coupled to the top of the enclosure wherein the post extends vertically from the top of the enclosure;
a shield coupled to the post, wherein:
the shield provides shade to the video displays;
the shield is larger than the top of the enclosure and includes an awning; and
the shield is spatially separated above the top of the enclosure;
a solar cell; and
a power-distribution and control system having:
a solar battery electrically coupled to the solar cell;
at least one direct current power source electrically tied in parallel with the solar battery;
a memory device that stores information to be displayed on the first video display and the second video display;
a controller coupled to the memory; and
a transceiver coupled to the controller.

* * * * *